US009310488B2

(12) United States Patent
Park et al.

(10) Patent No.: US 9,310,488 B2
(45) Date of Patent: Apr. 12, 2016

(54) APPARATUS AND METHOD FOR GENERATING DEPTH IMAGE

(75) Inventors: Yong-Hwa Park, Yongin-si (KR);
Eung-Sun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 393 days.

(21) Appl. No.: 13/090,683

(22) Filed: Apr. 20, 2011

(65) Prior Publication Data

US 2012/0069176 A1   Mar. 22, 2012

(30) Foreign Application Priority Data

Sep. 17, 2010   (KR) .................. 10-2010-0092035

(51) Int. Cl.
| | |
|---|---|
| *H04N 7/18* | (2006.01) |
| *G01S 17/36* | (2006.01) |
| *G01S 17/89* | (2006.01) |
| *G01S 7/481* | (2006.01) |
| *G01S 7/491* | (2006.01) |

(52) U.S. Cl.
CPC ............... *G01S 17/36* (2013.01); *G01S 7/4816* (2013.01); *G01S 7/4912* (2013.01); *G01S 7/4915* (2013.01); *G01S 17/89* (2013.01)

(58) Field of Classification Search
CPC ....... G01S 17/89; G01S 17/36; G01S 7/4816; G01S 7/49157
USPC .......................................... 348/135
See application file for complete search history.

(56) References Cited

U.S. PATENT DOCUMENTS

| 4,935,616 | A |   | 6/1990 | Scott |
|---|---|---|---|---|
| 4,988,859 | A | * | 1/1991 | Tsuchiya et al. ........ 250/214 VT |
| 5,075,863 | A | * | 12/1991 | Nagamune et al. ........... 702/159 |

(Continued)

FOREIGN PATENT DOCUMENTS

| JP | 2004-125733 A | 4/2004 |
|---|---|---|
| JP | 2005-106603 A | 4/2005 |

(Continued)

OTHER PUBLICATIONS

Büttgen, et al., "Pseudonoise Optical Modulation for Real-Time 3-D Imaging With Minimum Interference", IEEE Transactions on Circuits and Systems—I: Regular Papers, Oct. 10, 2007, vol. 54, No. 10, pp. 2109-2119.

(Continued)

*Primary Examiner* — Tat Chi Chio
*Assistant Examiner* — Nguyen Truong
(74) *Attorney, Agent, or Firm* — Sughrue Mion, PLLC

(57) ABSTRACT

An apparatus and method for generating a depth image are provided. The apparatus includes an optical modulator, an optical sensor, and a depth image processor. The optical modulator optically modulates light which is reflected from an object to which light modulated using a first pseudorandom (PN) sequence is irradiated. The optical modulator optically modulates the reflected light using second PN-sequences, where each of the second PN-sequences has a same PN sequence as the first PN-sequence, but the second PN-sequences have N different time shifts. The optical sensor senses the optically modulated reflective light. The depth image processor samples N intensity images from the optically modulated reflective light sensed by the optical sensor and generates a depth image of the object using the sampled N intensity images.

19 Claims, 17 Drawing Sheets

(56) References Cited

U.S. PATENT DOCUMENTS

| | | | |
|---|---|---|---|
| 5,081,530 | A | 1/1992 | Medina |
| 6,057,909 | A * | 5/2000 | Yahav et al. ............... 356/5.04 |
| 6,088,086 | A | 7/2000 | Muguira et al. |
| 6,100,517 | A | 8/2000 | Yahav et al. |
| 6,331,911 | B1 | 12/2001 | Manassen et al. |
| 6,794,628 | B2 | 9/2004 | Yahav et al. |
| 6,856,355 | B1 | 2/2005 | Ray et al. |
| 7,095,487 | B2 | 8/2006 | Gonzalez-Banos et al. |
| 7,230,685 | B2 | 6/2007 | Suzuki et al. |
| 7,283,213 | B2 * | 10/2007 | O'Connor et al. ........... 356/5.11 |
| 7,379,100 | B2 * | 5/2008 | Gokturk et al. ............ 348/229.1 |
| 7,405,812 | B1 * | 7/2008 | Bamji ........................... 356/5.1 |
| 2007/0098387 | A1 | 5/2007 | Turley et al. |
| 2007/0098388 | A1 | 5/2007 | Turley et al. |
| 2009/0059201 | A1 * | 3/2009 | Willner et al. .............. 356/5.01 |
| 2010/0163889 | A1 | 7/2010 | Park et al. |
| 2010/0177372 | A1 | 7/2010 | Park et al. |
| 2010/0182671 | A1 | 7/2010 | Park |
| 2010/0308211 | A1 | 12/2010 | Cho et al. |
| 2010/0321755 | A1 | 12/2010 | Cho et al. |
| 2010/0328750 | A1 | 12/2010 | Kim et al. |
| 2011/0176709 | A1 | 7/2011 | Park et al. |

FOREIGN PATENT DOCUMENTS

| | | |
|---|---|---|
| JP | 2005-345273 A | 12/2005 |
| KR | 10-2010-0080092 A | 7/2010 |
| KR | 10-2010-0084018 A | 7/2010 |
| KR | 10-2010-0084842 A | 7/2010 |
| KR | 10-2010-0130782 A | 12/2010 |
| KR | 10-2010-0135548 A | 12/2010 |
| KR | 10-2010-0138147 A | 12/2010 |
| KR | 10-2011-0085785 A | 7/2011 |

OTHER PUBLICATIONS

Büttgen, et al., "Robust Optical Time-of-Flight Range Imaging Based on Smart Pixel Structures", IEEE Transactions on Circuits and Systems—I: Regular Papers, Jul. 6, 2008, vol. 55, No. 6, pp. 1512-1525.

* cited by examiner

APPARATUS AND METHOD FOR GENERATING DEPTH IMAGE

CROSS-REFERENCE TO RELATED APPLICATIONS)

This application claims priority from Korean Patent Application No. 10-2010-0092035, filed on Sep. 17, 2010, in the Korean Intellectual Property Office, the entire disclosure of which is incorporated by reference herein for all purposes.

BACKGROUND

1. Field

Apparatuses and methods consistent with the following description relate to capturing an image, and more particularly, to generating a depth image to generate distance information.

2. Description of the Related Art

Recently, techniques for obtaining distance information of an object, including a three-dimensional (3D) camera or laser radar (LADAR) have been researched. As one of techniques for obtaining distance information of an object, a light time-of-flight measurement method is used, which measures a distance (hereinafter, referred to as a "depth") from an image capturing apparatus to an object.

The time-of-flight measurement method primarily projects light of a particular wavelength onto an object, and measures or captures light of the same wavelength reflected from the object through a special transformation process using a photodiode or a camera. Special processing is performed to extract depth using the measurement value obtained by the photodiode or the camera. In this regard, various time-of-flight measurement methods for the above optical process procedure, that is, a series of procedures including light source projection, reflection from the object, optical modulation, capturing, and processing have been introduced.

As one example of the time-of-flight measurement methods, a shutter light pulse method projects light of a particular wavelength (e.g., far-red light of 850 nm) of an object to be captured to the object using a light emitting diode (LED) or a laser diode (LD), modulates an optical image which is reflected from the object and has the same wavelength as the initially projected light using an image intensifier or a specific modulation element, and captures an image from the optically modulated optical image using an image sensor. Then, a value measured by capturing the image through the image sensor is processed, so that depth of a point or the image is obtained.

During the above procedures, to identify a phase difference according to a distance of light or light time-to-flight, optical modulation is required to be performed at ultrahigh speed ranging from several tens of MHz to several hundreds of MHz. To this end, an image intensifier employing a multi-channel plate is used or a sold-state modulator element formed of a substance selected from a group of GaAs. Recently, a thin modulator element that uses a GaAs-based modulator element and an electro-optic substance has been employed to improve the characteristics.

Meanwhile, examples of a recently introduced method of pulse driving a light source and an optical modulator element during an optical process for depth extraction may include a method of using a particular waveform such as a triangle waveform such as a ramp waveform, a method of using a sine wave, and a method of using an intact nonlinear waveform. The above methods require a method of driving a light source and an optical modulator element and a depth extraction calculation method using a captured intensity value, which is called a depth algorithm.

In the above-described methods, when multiple users simultaneously capture an image of an object in a close distance, a disadvantage occurs in that infrared light sources projected from different cameras are generally incident to optical systems of all cameras, causing an error in a depth extraction result.

SUMMARY

According to an aspect of an exemplary embodiment, there is provided an apparatus for generating a depth image, the apparatus comprising an optical modulator which optically modulates reflective light which is reflected light from an object to which light modulated using a first pseudorandom (PN) sequence is irradiated, by use of second PN-sequences, each of which has a same PN sequence as the first PN-sequence, but the second PN-sequences having N different time shifts; an optical sensor which senses the optically modulated reflective light; and a depth image process unit which samples N intensity images from the optically modulated reflective light sensed by the optical sensor and generates a depth image of the object using the sampled N intensity images.

According to another aspect of an exemplary embodiment, there is provided an apparatus for generating a depth image, the apparatus comprising an optical modulator which optically modulates reflective light which is reflected light from an object to which light modulated using N first pseudorandom (PN) sequences having, respectively, N different time shifts is irradiated, by use of a second PN-sequence which has a same PN sequence as that of the first PN-sequences but has a time shift different from those of the first PN-sequences; an optical sensor which senses the optically modulated reflective light; and a depth image process unit which samples N intensity images from light signals sensed by the optical sensor and generates a depth image of the object using the sampled N intensity images.

According to another aspect of an exemplary embodiment, there is provided a method of generating a depth image, the method comprising performing optical modulation on reflective light which is reflected light from an object to which light modulated using a first pseudorandom (PN) sequence is irradiated, by use of a second PN-sequence which has a same PN sequence as a first PN-sequence but the second PN-sequence has N different time shifts; sensing the optically modulated reflective light; sampling N intensity images obtained from the sensed optically modulated reflective light; and generating a depth image of the object using the N sampled intensity images.

BRIEF DESCRIPTION OF THE DRAWINGS

The above and/or other aspect of the present disclosure will be more apparent from the following detailed description and the accompanying drawings, in which.

DETAILED DESCRIPTION

Figure 1:
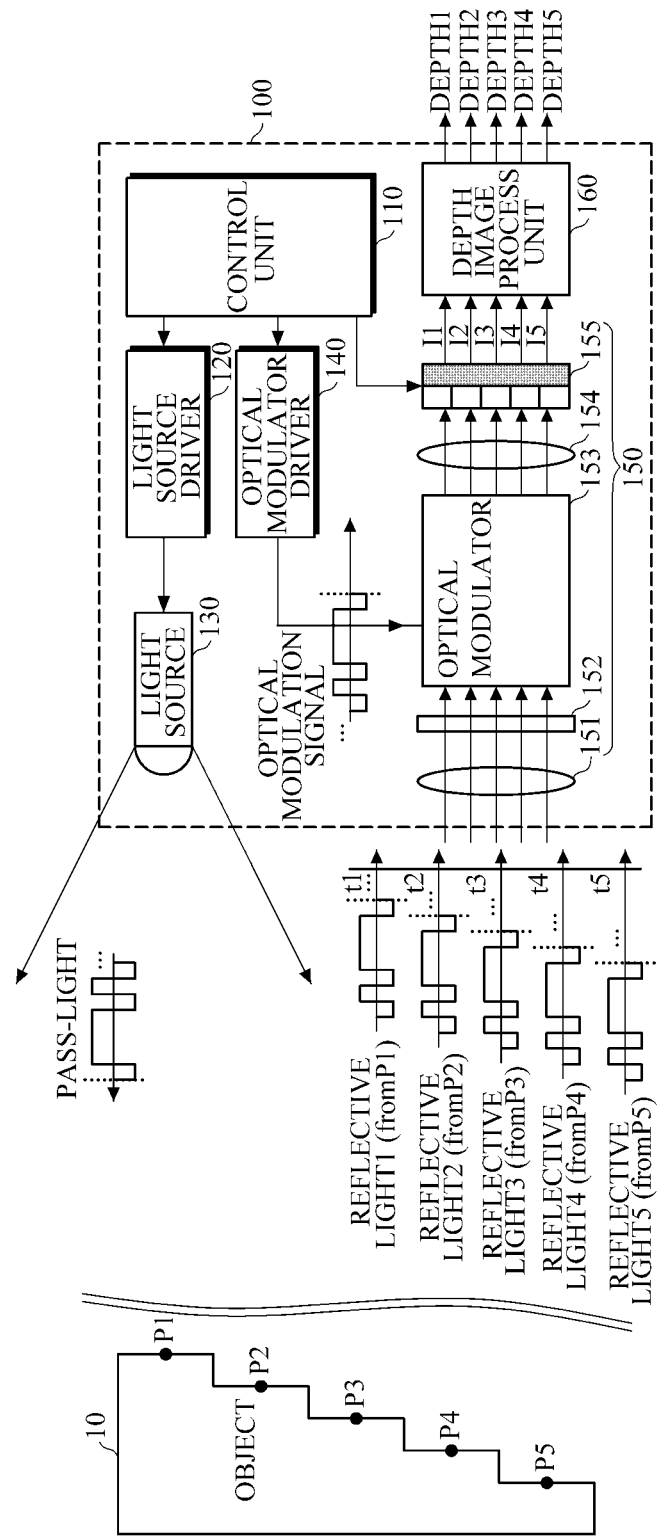
FIG. 1 is a diagram illustrating an example of an apparatus for generating a depth image using a pseudorandom waveform according to an exemplary embodiment.

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Throughout the drawings and the detailed description, unless otherwise described, the same drawing reference numerals will be understood to refer to the same elements, features, and structures. The relative size and depiction of these elements may be exaggerated for clarity, illustration, and convenience.

FIG. 1 illustrates an example of an apparatus for generating a depth image using a pseudorandom waveform according to an exemplary embodiment.

The apparatus 100 may include a control unit 110, a light source driver 120, a light source 130 which may be infrared (IR), an optical modulator driver 140, an image acquisition unit 150, and a depth image process unit 160. The image acquisition unit 150 may include a first lens 151, an IR filter 152, an optical modulator 153, a second lens 154, and an optical sensor 155.

The apparatus 100 may emit light by driving the light source 130 with a particular pseudorandom sequence (hereinafter, will be referred to as a "PN-sequence"), and the optical modulator 153 of the image acquisition unit 150 may extract a distance to an object 10, that is, a depth by use of an image acquired by performing optical modulation to the same waveform of the light emitted from the light source 130, that is, an auto-correlation value of the PN-sequence. The PN-sequence is a binary function having two values. As one of waveforms generally used for code division multiple access (CDMA) scheme which is actively employed in a communication field, the PN-sequence is used to identify a communication device user and effectively prevent interference between multiple users.

The control unit 110 may control the overall system of the apparatus 100 since the control unit 110 is connected to the light source driver 120, the optical modulator driver 140, the image acquisition unit 150, and the depth image process unit 160.

Under the control of the control unit 120, the light source driver 120 may output an appropriate electric signal and drive the light source 130 to perform amplitude modulation on the light.

The light source 130 may be formed of an element that outputs light in the invisible IR band (for example, far-red light of 850 nm) in consideration of the safety of user's eyes. Examples of the light source 130 may include, for example, a laser diode (LD) and a light emitting diode (LED), and the wavelength bands and a type of the light source are not limited.

The light output from the light source 130 may reach the object 10, be reflected from the object 10, and be incident to the first lens 151 which is an incident lens of the image acquisition unit 150.

Reflective light may pass through the first lens 151 and be focused. The IR filter 150 may filter the focused light to make the focused light in a band close to the center wavelength of the light source pass therethrough so as to remove ambient light or noise. The light passing through the IR filter 152 reaches the optical modulator 153.

The optical modulator 153 may be driven with the PN-sequence having the same length and cycle as the light source 130 by the optical modulator driver 140. Hereinafter, the PN-sequence used as a driving waveform for the light source 130 will be referred to as a "first PN-sequence," and the PN-sequence used as a driving waveform for the optical modulator 153 will be referred to as a "second PN-sequence." The second PN-sequence may have the same sequence as the first PN-sequence, but have N different time shifts from the first PN-sequence. The first PN-sequence and the second PN-sequence may be bipolar m-sequences and a minimum information unit transmission time $T_C$ and a length of sequence may be the same in both first and second PN-sequences. The time shift may have various values according to depth extraction algorithms which will be described later.

That is, the control unit 110 may control the light source driver 120 to generate a light source driving waveform of the light source by use of the first PN-sequence, and control the optical modulator driver 140 to generate an optical modulation driving waveform for the optical modulator 153 by use of the second PN-sequence.

The second lens 154 may be configured to allow adjusting the magnification of an image to be captured by the optical sensor 155 or refocusing the image. The optical sensor 155 may sense reflective light that is modulated by the optical modulator 153.

The optical sensor 155 may be, for example, a charge-coupled device (CCD), or a complementary metal oxide semiconductor (CMOS), but is not limited thereto. The optical sensor 155 may be formed of an optical detection element corresponding to one pixel. For example, in case of measuring a distance of a single pixel, a single photodiode and an integrator may be used as the optical sensor 155.

The optical sensor 155 may be formed of a one-dimensional pixel array including a plurality of pixels, or a two-dimensional pixel array. If the optical sensor 155 is formed of one optical detection element, the optical sensor 155 may obtain intensity information of the sensed light. If the optical sensor 155 is formed of a plurality of pixels, intensity information per pixel obtained by the optical sensor 155 or intensity information of one frame is referred to as an intensity image.

Reflective light beams (REFLECTIVE LIGHT1 to REFLECTIVE LIGHT5 in FIG. 1), respectively, represent light beams reflected from at positions P1, P2, P3, P4, and P5 of the object 100. For explanation, the positions P1, P2, P3, P4, and P5 are illustrated to become sequentially farther from the apparatus 100. In this case, light reflected from the position P1 close to the apparatus 100 reaches the incident lens of the apparatus 100 after a relatively short lapse of time $t_1$ from the transmission time. Light reflected from the position P5 far from the apparatus 100 reaches the incident lens of the apparatus 100 after a longer lapse of time $i_s$ than $t_1$.

The control unit 110 may control the optical modulator driver 140. The optical modulator 153 may be driven by the optical modulator driver 140. As the result of driving, the optical modulator 153 may act as a pass filter having a variable gain that modulates the intensity of reflective light. The optical modulator 153 may perform modulation at a high speed from several tens of MHz to several hundreds of MHz to identify phase differences according to distance to light or time-of-flight (TOF) of light. To this end, an image intensifier employing a multi-channel plate (MCP) is generally used, or a modulator element formed of a substance selected from a group of GaAs. In addition, the optical modulator 153 may use a GaAs-based modulator element and a thin modulator element using electrooptic substance.

To make the second PN-sequence have N different time shifts from one another than those of the first PN-sequence, the control unit 110 may generate the second PN-sequence after a predefined lapse of time with respect to the first PN-sequence, and control the optical modulator driver 140 to generate a driving waveform of the optical modulator 153 according to the generated second PN-sequence.

As another example, the control unit 10 may control the light source driver 120 and the optical modulator driver 140 to perform optical modulation on reflective light reflected from the object, to which light modulated using the N first PN-sequences each of which has a different time shift is emitted, by use of one second PN-sequence of which sequence is the same as that of the first PN-sequence but has a different time shift from the first PN-sequence. To this end, the control unit 110 may generate the N first PN-sequences which have a predefined lead time with respect to the second PN-sequence, and control the light source driver 120 to generate a light source driving waveform according to the generated first PN-sequences.

The depth image process unit 160 may sample N intensity images from the sensed light signals and generate a depth image of the object 10 using the sampled N intensity images. The depth image process unit 160 may sample N intensity images corresponding to the respective different time shifts of the second PN-sequence. Referring to the example illustrated in FIG. 1, the control unit 110 may control the optical sensor 155 to acquire intensity images I1 to I5 for depth extraction by specifying an exposure time per image frame appropriately. The acquired intensity images may be input to the depth image process unit 160. The depth image process unit 160 may calculate and output depths 1 to 5.

The depth image process unit 160 may generate a depth image using intensity images having at least three different intensities sensed by the optical sensor 155. The depth image process unit 160 may model the sampled intensity images to a function including an unknown quantity that is time-of-flight $t_{TOF}$ of light irradiated from the light source 130 to the optical sensor 155, and calculate the time-of-flight of the light using the N sampled intensity images. The function including the time-of-flight of light as the unknown quantity may further include the ambient light and reflectivity of the reflective light as the unknown quantities.

To this end, when a plurality of times-of-flight are estimated using the N sampled intensity images and accordingly a plurality of depths are determined, the depth image process unit 160 may determine a final depth by averaging the plurality of depths. Alternatively, when a plurality of times-of-flight are estimated using the N sampled intensity images and accordingly a plurality of depths are determined, the depth image process unit 160 may determine depth extraction errors of the respective depths, and select a depth having the smallest depth extraction error as the final depth.

Operation of calculating depths and generating a depth image will be described in detail with reference to FIGS. 8A to 9D.

To expand a range of the depth image to be captured, while the control unit 110 controls the optical modulator driver 140 to maintain a regular interval between time shifts of the second PN-sequence, the depth image process unit 160 may increase the number of times of sampling the intensity image.

In addition, to improve the precision of the depth image, the control unit 110 may control the light source driver 120 and the optical modulator driver 140 such that an interval between the time shifts becomes smaller than the minimum information transmission transfer time $T_C$ of the first and second PN-sequences, and the depth image process unit 160 may sample the intensity image at intervals of a time shift.

Figure 2A:
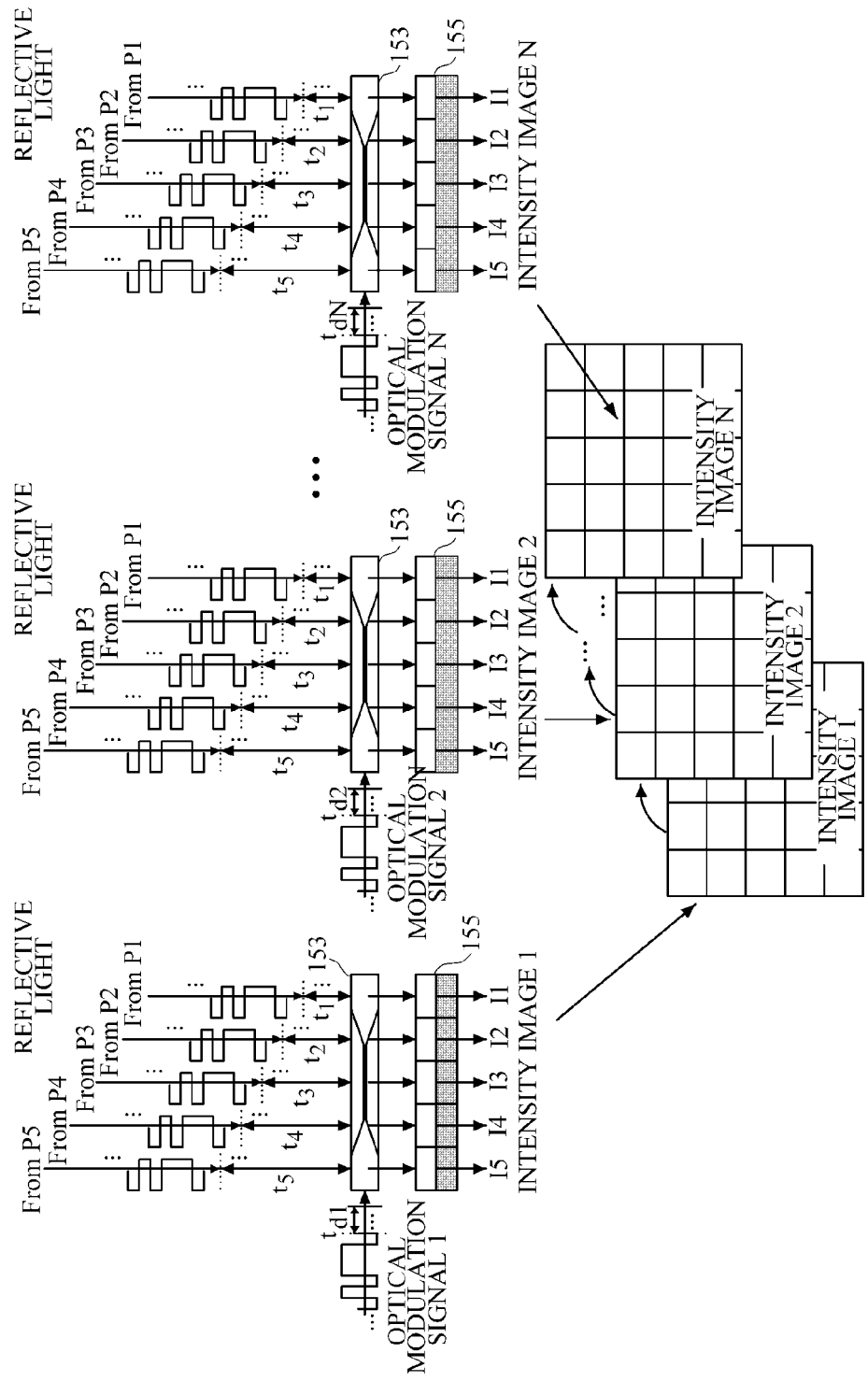
FIGS. 2A and 2B are diagrams illustrating examples of a method of capturing an intensity image per each sub-frame according to an exemplary embodiment.
Figure 2B:
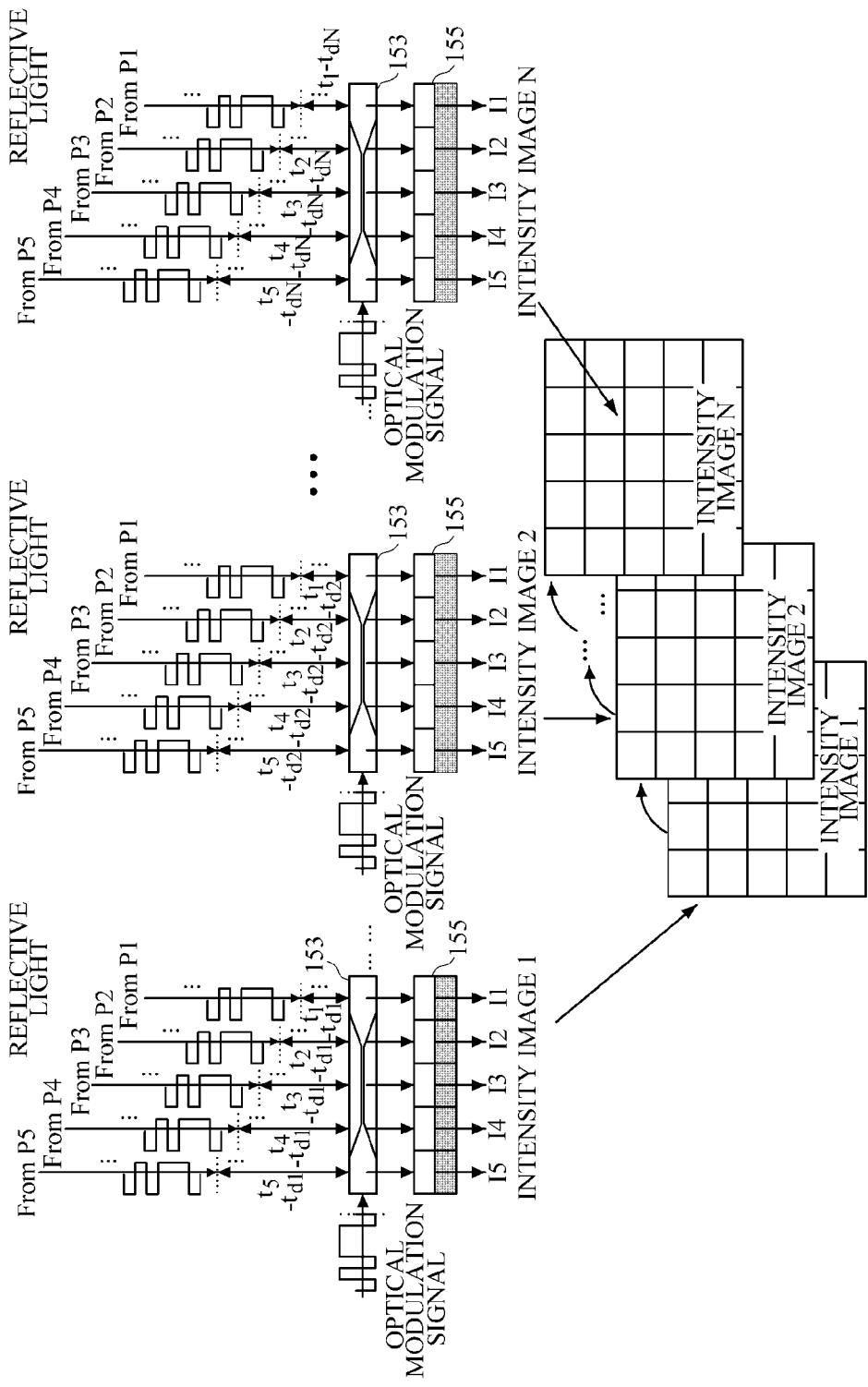

FIGS. 2A and 2B illustrate examples of a method of capturing an intensity image per each sub-frame according to an exemplary embodiment.

To obtain one depth image, three or more intensity images may be used. FIGS. 2A and 2B show examples of a method of capturing N intensity images sequentially. The depth image is referred to as a "main frame," and a plurality of intensity images used for obtaining one depth image are referred to as "sub-frames."

An exposure time $T_{sub}$ of the optical sensor 155 to capture each intensity image, that is, a sub-frame, may be determined to be about 1/N of a time $T_{main}$ spent on outputting a depth image frame from the apparatus 100 ($T_{sub}=1/N*T_{main}$). However, the exposure time $T_{sub}$ for capturing each sub-frame is not limited to a particular time, and may be modified appropriately according to a surrounding environment.

Referring to the example illustrated in FIG. 2A, the sub-frame may be captured for the exposure time $T_{sub}$ of the optical sensor 155 as below.

The control unit 110 may drive the light source 130 by issuing a control signal to the light source driver 120, thereby implementing transmitted light formed of the first PN-sequence. The transmitting light is reflected at the respective positions P1 to P5 of the object and incident to the optical modulator 153. For convenience of explanation, it is assumed that optical sensors 155 at the positions P1 to P5 corresponding to, for example, the respective five pixels of a CCD. As shown in the example illustrated in FIG. 2A, the reflective light beams at the respective positions P1 to P5 reach the optical sensor 155 after a predefined lapse of times $t_1$ to $t_5$ corresponding to the distances to the camera.

A reflective light image is modulated in its intensity according to the optical modulation signal while passing through the optical modulator 153. That is, the reflective light and the optical modulation signal are multiplied to form a modulated image. As described above, the optical modulation signal uses the PN-sequence which is the same as the transmitted light and may have N different time shifts, for example, time delays $t_{d1}, t_{d2}, \ldots, t_{dN}$, when capturing N sub-frames.

The modulated light image reaches the optical sensor at a rear portion, an intensity image 1 (INTENSITY IMAGE1 in FIG. 2A) to an intensity image N (INTENSITY IMAGEN in FIG. 2A) may be sequentially captured since the modulated light images are accumulated for the exposure time $T_{sub}$. As such, by use of the same transmitted light and time shifts $t_{d1}$, $t_{d2}, \ldots, t_{dN}$ of different optical modulation signals of different optical modulators 153, N sub-frames may be generated.

In the mean time, as shown in the example illustrated in FIG. 2B, when the same signal as used in FIG. 2A is used as the optical modulation signal of the optical modulator 153 and a lead time $t_{l1}, t_{l2}, \ldots, t_{lN}$ is used as different time shifts of the light source driving signal, the same sub frame can be generated. At this time, $(t_{l1}, t_{l2}, \ldots, t_{lN}) = (t_{d1}, t_{d2}, \ldots, t_{dN})$.

The methods shown in the examples illustrated in FIGS. 2A and 2B are different from each other in that in the example illustrated in FIG. 2A, the optical modulator 153 is driven with the N second PN-sequences having predefined lapses of time with respect to the first PN-sequence, and in the example illustrated in FIG. 2B, the light source 130 is driven with the N first PN-sequences which are driven a predefined lead time before the second PN-sequence. However, the sub-frame obtained by the optical sensor 155 and the depth calculation result by the depth image process unit 160 are the same in both examples illustrated in FIG. 2A and FIG. 2B.

Hereinafter, for convenience of explanation, as shown in FIG. 2A, a method of driving the optical modulator 153 with a first PN-sequence and N second PN-sequences having a predefined period of time shifts (or time lapses) with respect to the first PN-sequence will be described.

Figure 3:
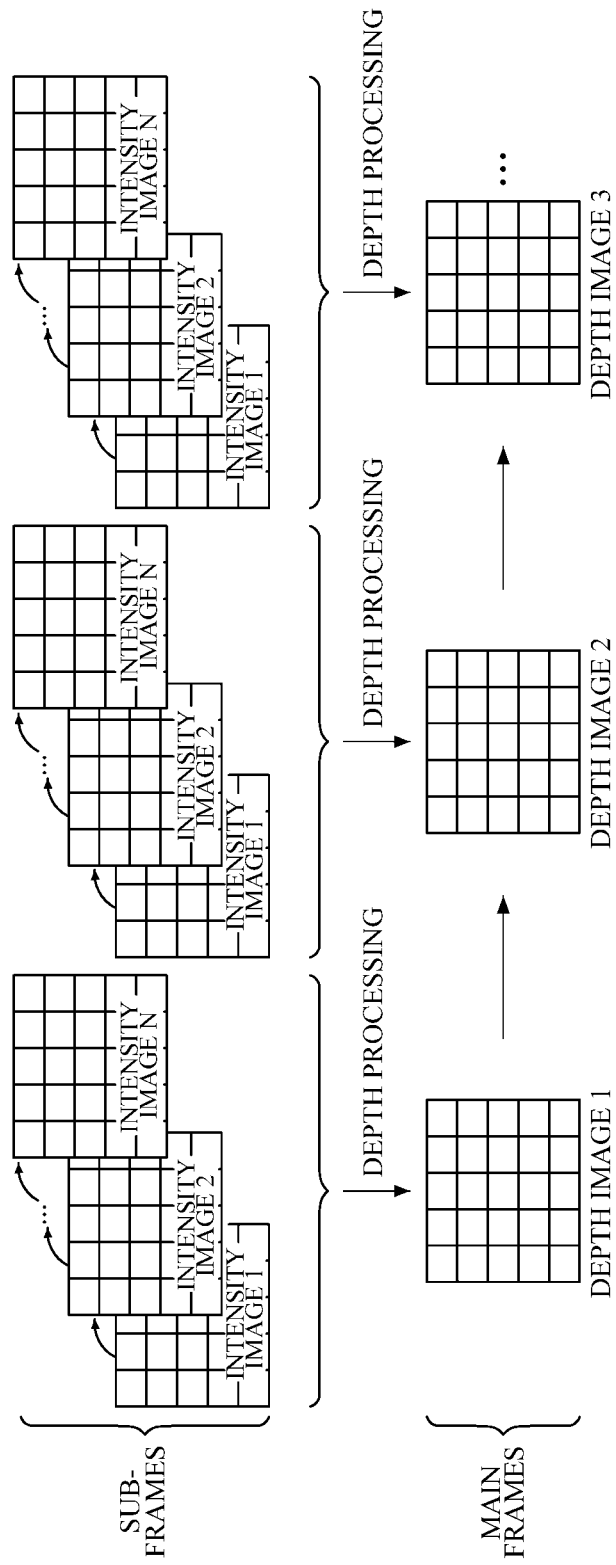
FIG. 3 is a diagram illustrating an example of operation of generating a depth image according to an exemplary embodiment.

FIG. 3 illustrates an example of operation of generating a depth image according to an exemplary embodiment.

As shown in the example illustrated in FIG. 3, to obtain one depth image, N intensity images may be used. The depth image may be repeatedly calculated to be output while following movement of the object as a real-time moving picture with a frame rate $F_{main}$. In this case, $F_{main} = 1/T$.

Characteristics of a PN-sequence and a principle of generating a depth image will be described with reference to examples illustrated in FIGS. 4 and 5.

Figure 4:
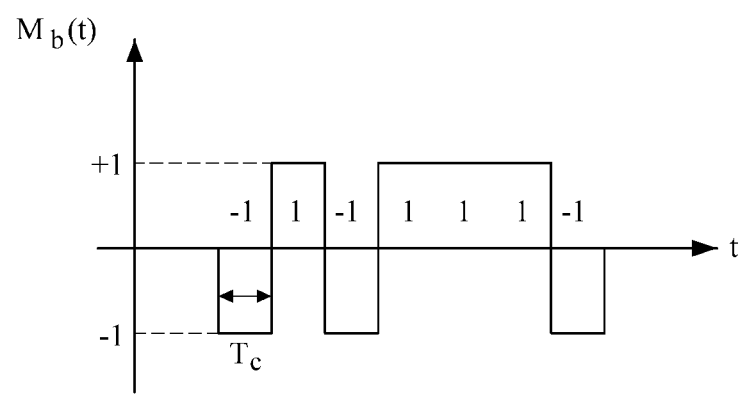
FIG. 4 is a diagram illustrating an example of a bipolar m-sequence according to an exemplary embodiment.

FIG. 4 illustrates an example of a bipolar m-sequence according to an exemplary embodiment.

A bipolar m-sequence $M_b(t)$ is a kind of a PN-sequence. The bipolar m-sequence $M_b(t)$ consists of continuous functions having two values "1" and "−1," and has a chip duration $T_C$ as the minimum information unit transmission time. In the example illustrated in FIG. 4, for convenience of explanation, it is assumed that the length n of a sequence is 7.

$T_C$ and the sequence length n may be defined appropriately in consideration of a frame rate of a range of a distance to be measured in applying to the apparatus 100. The bipolar m-sequence may be set to be repeated at predefined intervals to drive the light source 130 and the optical modulator 153, and the interval, i.e., $n*T_C$, may be defined to be shorter than a sub-frame exposure time $T_{sub}$ and be long enough to prevent interference between the users. In application to the apparatus 100, the sequence length n may be defined to be more than 1000.

The bipolar m-sequence shown in the example illustrated in FIG. 4 may have auto-correlation as below.

$$\Psi(\tau) \equiv \lim_{T \to \infty} \frac{1}{T} \int_0^T M_b(t+\tau) M_b(t) \, dt, \quad \text{[Equation 1]}$$

where $M_b^{(t)}$ denotes a bipolar m-sequence.

Figure 5:
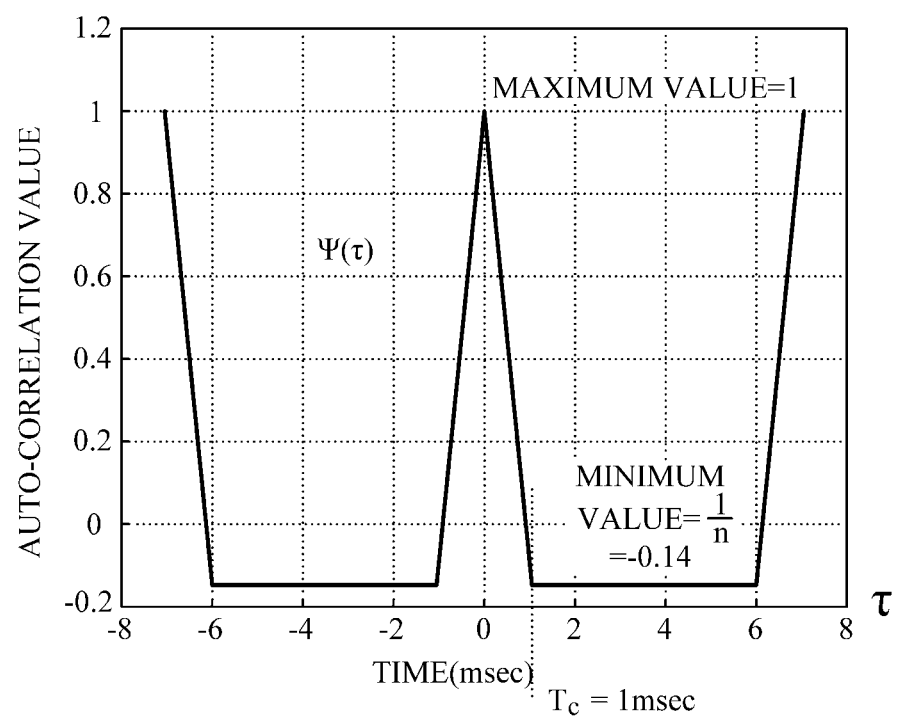
FIG. 5 is a graph showing auto-correlation of a bipolar m-sequence according to an exemplary embodiment.

FIG. 5 illustrates a graph showing auto-correlation of a bipolar m-sequence. The auto-correlation of the bipolar m-sequence reaches a maximum value, 1, when −r=0, and the maximum value is repeated at an interval of $n*T_C$. In a region, $-T_C \leq \tau \leq T_C$, a linear function is shown, and in the remaining region, the auto-correlation value is 1/n. Generally, in application to the apparatus 100, n may be set to be greater than 1000 to make 1/n negligible compared to 1.

If driving signals for the light source 130 and the optical modulator 153 are both m-sequences, modulated intensity, that is, the intensity of the reflective light of the optical modulator 153 after modulation may have mathematical characteristics such as auto-correlation shown in the example illustrated FIG. 5.

In one example, in a bipolar m-sequence, a region having great auto-correlation is used for distance extraction, and a region having small auto-correlation is assigned with auto-correlation or cross-correlation between other cameras, so that a disadvantage of interference between multiple users can be addressed.

A method of extracting depth using the depth image process unit 160 will now be described. When waveforms of the light source 130 and the optical modulator 153 are driven with a PN-sequence (for example a bipolar m-sequence), outcomes from the optical modulator 153 modulating a reflected wave from waveforms of the light source 130, that is, auto-correlation values are captured by the optical sensor 155. Then, the depth image process unit 160 may utilize a relationship between the auto-correlation and a value of time of flight (TOF) to extract time of flight $t_{TOF}$ of light for each pixel.

Hereinafter, an example of a method of calculating a depth will be described, focusing on a method which uses single-pass light and allows a light-modulated waveform of the optical modulator 153 to have more than three time shifts (here, time delay). In addition, even when an output from the apparatus 100 is an image formed of a two-dimensional array, a depth extraction method applied to each pixel is the same, and hence a method to be applied to one pixel will be described. However, if images formed of a two-dimensional array are simultaneously extracted, duplicated calculation, data management, and memory allocation may be efficiently processed to reduce the amount of calculation.

Referring to examples illustrated in FIGS. 6 and 7, an example of modeling the light source 130, the optical modulator 153, and waveform of reflective light will be described.

The light source 130 of the apparatus 100 may use a bipolar m-sequence as a driving waveform. Various sequences, for example, a Walsh-code or a gold-sequence may be used in a similar manner to extract the depth. Hereinafter, a bipolar m-sequence will be described as an example.

Figure 6:
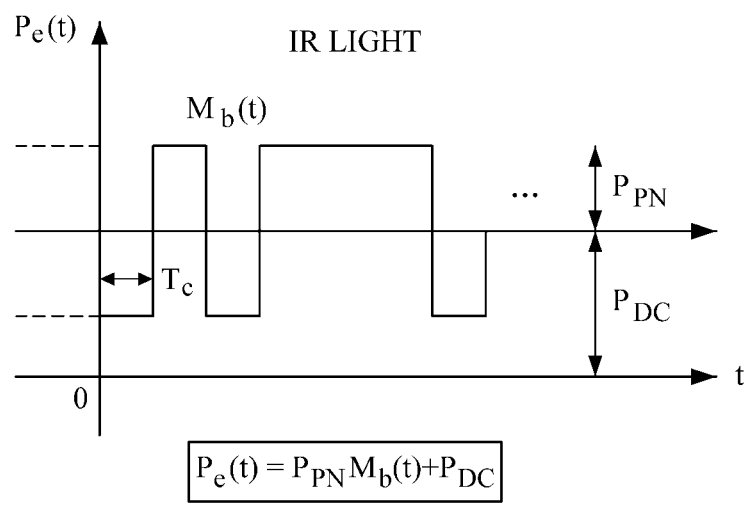
FIG. 6 is a diagram illustrating an example of a waveform of an infrared (IR) light source shown in the example illustrated in FIG. 1.

FIG. 6 illustrates an example of a waveform of the light source 130 shown in the example illustrated in FIG. 1.

$$P_e(t) = P_{PN} M_b(t) + P_{DC} \quad \text{[Equation 2]},$$

where $P_e(t)$ denotes a first PN-sequence of pass-light from the light source 130 to the object 10, and $P_{PN}$ denotes the magnitude of a term of alternate current (AC form) of the first PN-sequence. $P_{DC}$ denotes a direct current (DC) offset from the first PN-sequence. As described above, $M_b(t)$ denotes a bipolar m-sequence of the first PN-sequence.

In consideration of a maximum range of photographing by the apparatus 100 and depth frame rate stated in the specifications, a minimum information transmission unit $T_C$ of the first PN-sequence and a length n of sequence may be defined appropriately to constitute pass light.

Figure 7:
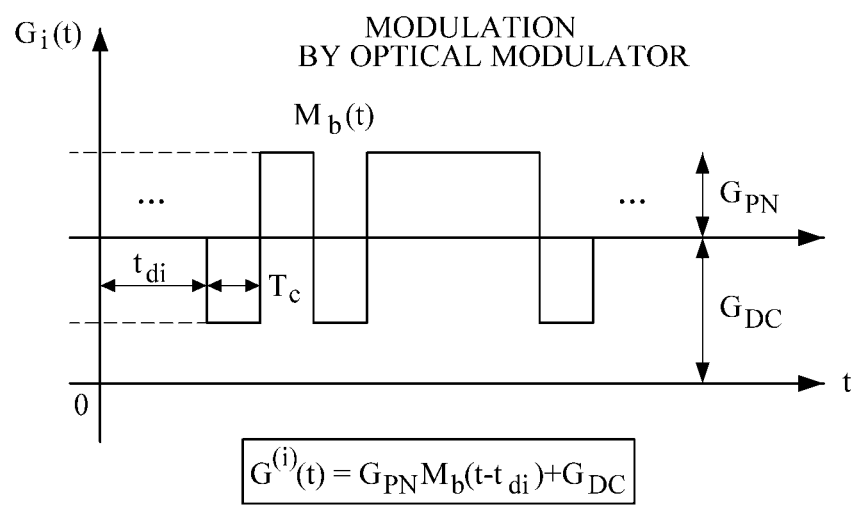
FIG. 7 is a diagram illustrating an example of a waveform of a first optical modulator shown in the example illustrated in FIG. 1.

FIG. 7 illustrates an example of a waveform of the first optical modulator shown in the example illustrated in FIG. 1.

In the example, the waveform of the optical modulator 153 is the same waveform of the light source 130 and is provided with an adequate time-delay $t_{di}$.

$$G^{(i)}(t)=G_{PN}M_b(t-t_{di})+G_{DC} \quad \text{[Equation 3]},$$

where $G^{(i)}(t)$ denotes a PN-sequence of a optical modulation gain of the optical modulator 153, that is, the second PN-sequence. $G_{PN}$ denotes an AC term of the second PN-sequence of the optical modulator 153. $G_{DC}$ denotes a DC offset of an optical modulation gain of the optical modulator 153. $t_{di}$ denotes a time-delay of the optical modulation waveform of the optical modulator 153 specified according to a selected depth extraction algorithm.

In addition, a bipolar m-sequence may be repeated periodically to drive the light source 130 and the optical modulator 153, and the period, that is, $(n*T_C)$ may be set to a value below $T_{sub}$, thereby preventing interference between users. The sequence length n in application to the apparatus 100 may be set to be larger than 1000.

The reflective light emitted from the light source 130 and reflected from the object 10 may be represented by Equation 4 as below based on light source waveform of Equation 2.

$$P_r(t)=r[P_{PN}M_b(t-t_{TOF})+P_{DC}]+P_{amb} \quad \text{[Equation 4]},$$

where $P_r(t)$ denotes reflective light, r denotes reflectivity of the reflective light, and $t_{TOF}$ denotes time of flight of light. $P_{amb}$ denotes ambient light.

That is, the reflective light $P_r(t)$ is in the form of a light source waveform which has a time delay of the same length as the time of flight $t_{TOF}$ of light and has its intensity changed by reflectivity r which is the combination of albedo of a surface of an object, a measurement distance, and the like, and which is combined with ambient light $P_{amb}$, that is irrelevant to a pass-light source. Here, the reflectivity r, the ambient light $P_{amb}$, and time of flight $t_{TOF}$ of light are unknown quantities.

The reflective light of Equation 4 is multiplied by the pass gain of the optical modulator 153 represented by Equation 3 and then reaches the optical sensor 155. The amount of light after passing through the optical modulator 153, that is, modulated light $I^{(i)}(t)$ may be represented by Equation 5 as below.

$$\begin{aligned} I^{(i)}(t) &= P_r(t) \times G^{(i)}(t) \quad \text{[Equation 5]} \\ &= rP_{PN}G_{PN}M_b(t-t_{TOF})M_b(t-t_{di}) + \\ &\quad rP_{PN}G_{DC}M_b(t-t_{TOF}) + \\ &\quad [rP_{DC}+P_{amb}]G_{PN}M_b(t-t_{di}) + \\ &\quad [rP_{DC}+P_{amb}]G_{DC} \end{aligned}$$

The modulated light $I^{(i)}(t)$ is accumulated in the optical sensor 155 for a given period of exposure time $T_{sub}$ to form an intensity image (sub-frame) $I^{(i)}_{CCD}$ that is formed of auto-correlation as below.

$$\begin{aligned} I^{(i)}_{CCD} &= \frac{1}{T_{sub}}\int_0^{T_{sub}} I^{(i)}(t)dt \quad \text{[Equation 6]} \\ &= rP_{PN}G_{PN}\psi(-t_{TOF}+t_{di})+[rP_{DC}+P_{amb}]G_{DC}, \end{aligned}$$

where $I^{(1)}_{CCD}$ denotes an ith intensity image of the optical sensor 155 which is captured after an $i^{th}$ time delay. Equation 6 is established as shown below when the length n of the sequence is long enough, and a PN-sequence of which n=1,000~10,000,000 may be used.

$$\frac{1}{T_{sub}}\int_0^{T_{sub}} M_b(t)dt = \frac{1}{n} \to 0, \quad \text{[Equation 7]}$$

where a gain of the optical sensor 155, that is, a ratio of voltage output to input optical energy, is denoted by 1 for convenience of explanation.

As shown in Equation 6, the image captured by the optical sensor 155 may be represented by known parameters, unknown reflectivity r, ambient light $P_{amb}$, and time of flight of light, which define the auto-correlation of an m-sequence, and waveforms of the light source 130 and the optical modulator 153.

In regard with the extraction of depth by the depth image process unit 160, it may be defined that three unknown quantities r, $t_{TOF}$, and $P_{amb}$ are determined using the output values of the optical sensor 155 $I^{(1)}_{CCD}, I^{(2)}_{CCD}, \ldots, I^{(N)}_{CCD}$ and known parameters $P_{PN}, P_{DC}, G_{PN}, G_{DC}$, and $T_C$ that represent waveforms of the light source and optical modulator.

To solve for the three unknown quantities, three or more equations are required, and to this end, more than three equations may be formed from the intensity image relation of Equation 6.

Then, an example of capturing an intensity image, that is, determining a depth by sampling an intensity image will be described with reference to FIGS. 8A to 8C.

Figure 8A:
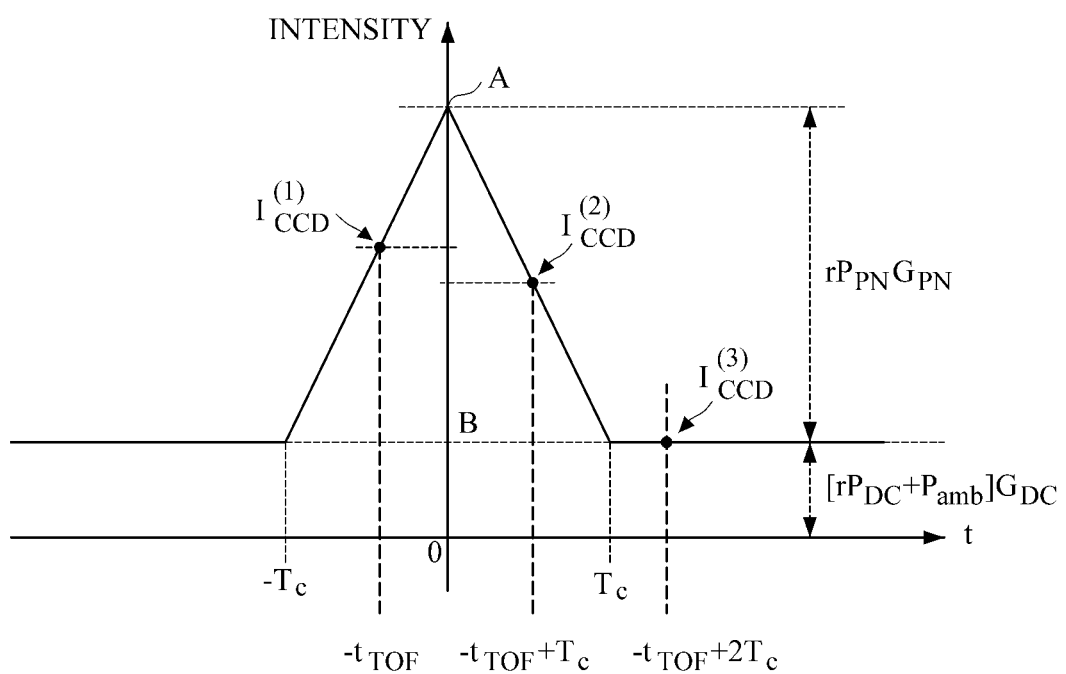
FIGS. 8A to 8C are diagrams illustrating examples of intensity images measured when a time delay of an optical modulator shown in the example illustrated in FIG. 1 is set to $T_C$.
Figure 8B:
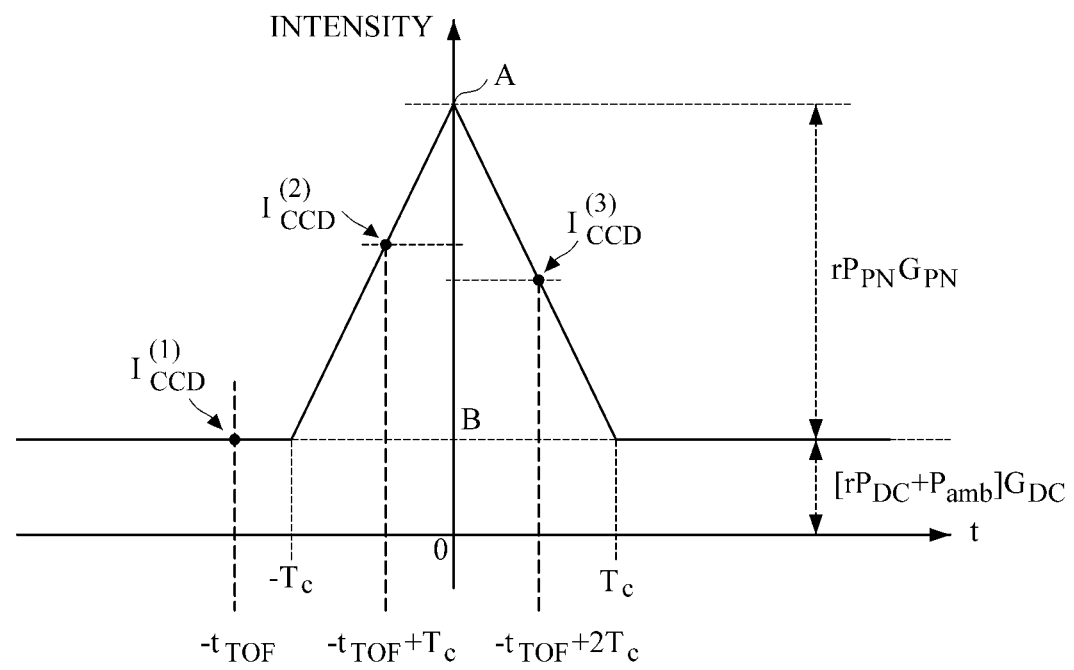
Figure 8C:
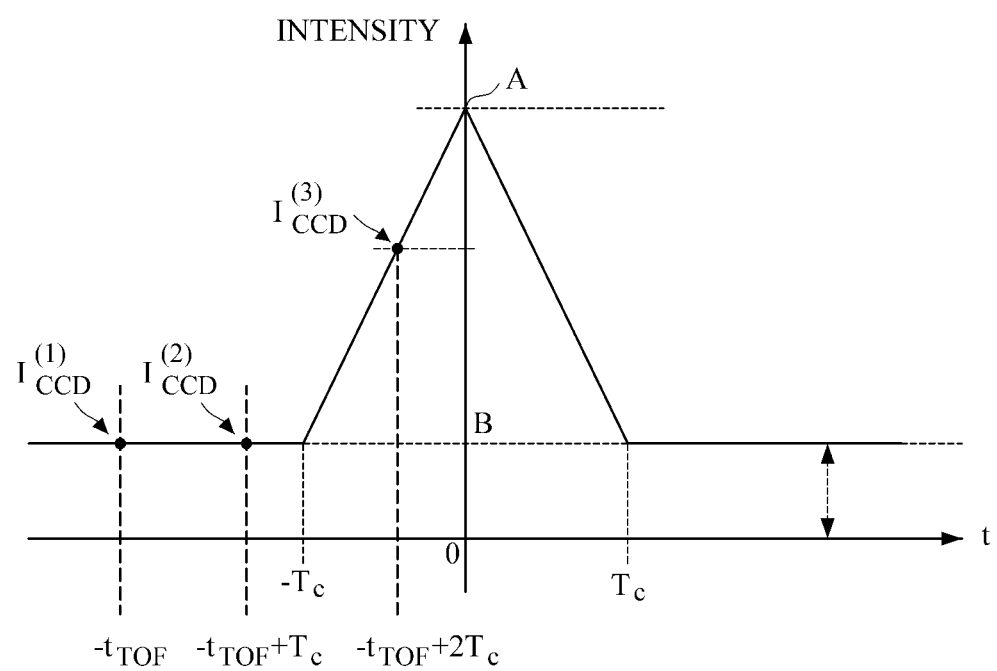

FIGS. 8A to 8C illustrate examples of intensity images measured when a time delay of the optical modulator 153 shown in the example illustrated in FIG. 1 is set to $T_C$.

As shown in the examples illustrated in FIGS. 8A to 8C, for example, the time delay $t_{di}$ of the optical modulator 153 is set to $(0, T_C, 2T_C)$ and the intensity images $I^{(1)}_{CCD}, I^{(2)}_{CCD}, I^{(3)}_{CCD}$ are sequentially captured.

FIG. 8A illustrates an example of intensity measured by an optical sensor in the case of $0<t_{TOF}<T_C$. When $0<t_{TOF}<T_C$, simultaneous equations shown as Equation 8 may be obtained from Equation 6.

$$\begin{aligned} &\text{where } t_{di}=0, \quad \text{[Equation 8]} \\ &I^{(1)}_{CCD} = \frac{rP_{PN}G_{PN}}{T_c}(-t_{TOF})+r(P_{PN}G_{PN}+P_{DC}G_{DC})+P_{amb}G_{DC} \\ &\text{Where } t_{di}=T_c \\ &I^{(2)}_{CCD} = -\frac{rP_{PN}G_{PN}}{T_c}(-t_{TOF}+T_c)+ \\ &\qquad r(P_{PN}G_{PN}+P_{DC}G_{DC})+P_{amb}G_{DC} \\ &\text{Where } t_{di}=2T_c \\ &I^{(3)}_{CCD} = [rP_{DC}+P_{amb}]G_{DC} \end{aligned}$$

The time of flight of light may be represented by Equation 9 from simultaneous equations of Equation 8.

$$t_{TOF} = T_c\frac{I^{(2)}_{CCD}-I^{(3)}_{CCD}}{I^{(1)}_{CCD}+I^{(2)}_{CCD}-2I^{(3)}_{CCD}} = T_c\frac{I^{(23)}_{CCD}}{I^{(13)}_{CCD}+I^{(23)}_{CCD}}, \quad \text{[Equation 9]}$$

where CCD $I_{CCD}^{(ij)} = I_{CCD}^{(i)} - I_{CCD}^{(j)}$ denotes a difference between an ith captured intensity image and a jth captured intensity image of the optical sensor 155.

$$I_{CCD}^{(13)} = I_{CCD}^{(1)} - I_{CCD}^{(3)}, \text{ and } I_{CCD}^{(23)} = I_{CCD}^{(2)} - I_{CCD}^{(3)}.$$

Thus, a distance to the object, that is, a depth may be represented by Equation 10 below.

$$\text{depth} = \frac{cT_c}{2} \frac{I_{CCD}^{(23)}}{I_{CCD}^{(13)} + I_{CCD}^{(23)}}, \quad \text{[Equation 10]}$$

where c denotes the speed of light.

FIG. 8B illustrates an example of an intensity image measured by the optical sensor 155 shown in the example illustrated in FIG. 1 when $T_C < t_{TOF} < 2T_C$.

When three equations are formed as shown above and the time of flight of light and a depth are calculated, the results may be represented by Equation 11 and Equation 12.

$$I_{CCD}^{(1)} = B \neq 0 \quad \text{[Equation 11]}$$
$$I_{CCD}^{(2)} = -\frac{A-B}{T_c}(-t_{TOF} + T_c) + A$$
$$I_{CCD}^{(3)} = -\frac{A-B}{T_c}(-t_{TOF} + 2T_c) + A$$

Here, $A = rP_{PN}G_{PN} + [rP_{DC} + P_{amb}]G_{DC}$, and $B = [rP_{DC} + P_{amb}]G_{DC}$.

$$\text{depth} = \frac{cT_c}{2}\left[1 + \frac{I_{CCD}^{(31)}}{I_{CCD}^{(21)} + I_{CCD}^{(31)}}\right] \quad \text{[Equation 12]}$$

Here, $I_{CCD}^{(21)} = I_{CCD}^{(2)} - I_{CCD}^{(1)}$, and $I_{CCD}^{(31)} = I_{CCD}^{(3)} - I_{CCD}^{(1)}$.

FIG. 8C illustrates an example of how to determined a condition that is $2T_C < t_{TOF}$ using measurements of the optical sensor 155, and how to extract a depth.

In the case of $2T_C < t_{TOF}$, there are two independent measurements, and thus $t_{TOF}$ cannot be obtained. That is, if three measurements of the optical sensor 155 are used, a maximum distance measurement range is $2T_C \cdot c/2 = c \cdot T_C$.

As such, when three intensity images are sampled, the depth image process unit 160 may determine whether an intensity image having the minimum intensity is the first captured intensity image $I_1$ or the thirdly captured intensity image $I_3$, and calculate a depth according to the determination result. Equation 13 below summarizes determining a depth using three intensity images.

i) By applying consecutive leading times $(0, T_C, 2T_C)$ of the IR light source 130 or delay times $(0, T_C, 2T_C)$ of the optical modulator 153, intensity images $I^{(1)}_{CCD}$, $I^{(2)}_{CCD}$, $I^{(3)}_{CCD}$ of the optical sensor 155 are generated with an PN-sequence at the minimum information unit transmission time $T_C$, that is, intensity values are measured.

ii) The minimum intensity image $I^{(M)}_{CCD}$ is calculated.

$$\min(I_{CCD}^{(1)}, I_{CCD}^{(2)}, I_{CCD}^{(3)}) = I_{CCD}^{(M)} \quad \text{[Equation 13]}$$

iii) when $I^{(M)}_{CCD} = I^{(3)}_{CCD}$, $$\text{depth} = \frac{cT_c}{2} \frac{I_{CCD}^{(23)}}{I_{CCD}^{(13)} + I_{CCD}^{(23)}}$$

when $I^{(M)}_{CCD} = I^{(1)}_{CCD}$, $$\text{depth} = \frac{cT_c}{2}\left[1 + \frac{I_{CCD}^{(31)}}{I_{CCD}^{(21)} + I_{CCD}^{(31)}}\right],$$

and when $I^{(M)}_{CCD} = I^{(1)}_{CCD} = I^{(2)}_{CCD}$, $\text{depth} > cTC$.

Hereinafter, an example of calculating a depth by sampling more than four general intensity images will be described with reference to FIGS. 9A to 9D.

If four intensity images are sampled by applying an additional time delay of $3T_C$ to the optical modulator 153 in the above method of sampling the three intensity images, three independent equations are generated and the unknown quantity, $t_{TOF}$, can be extracted even when $2T_C < t_{TOF} < 3T_C$.

FIGS. 9A to 9D illustrate examples of how to sample four intensity images in regions of $0 < t_{TOF} < T_C$, $T_C < t_{TOF} < 2T_C$, $2T_C < t_{TOF} < 3T_C$, and $3T_C < t_{TOF}$, and extract depths in the respective regions.

Figure 9A:
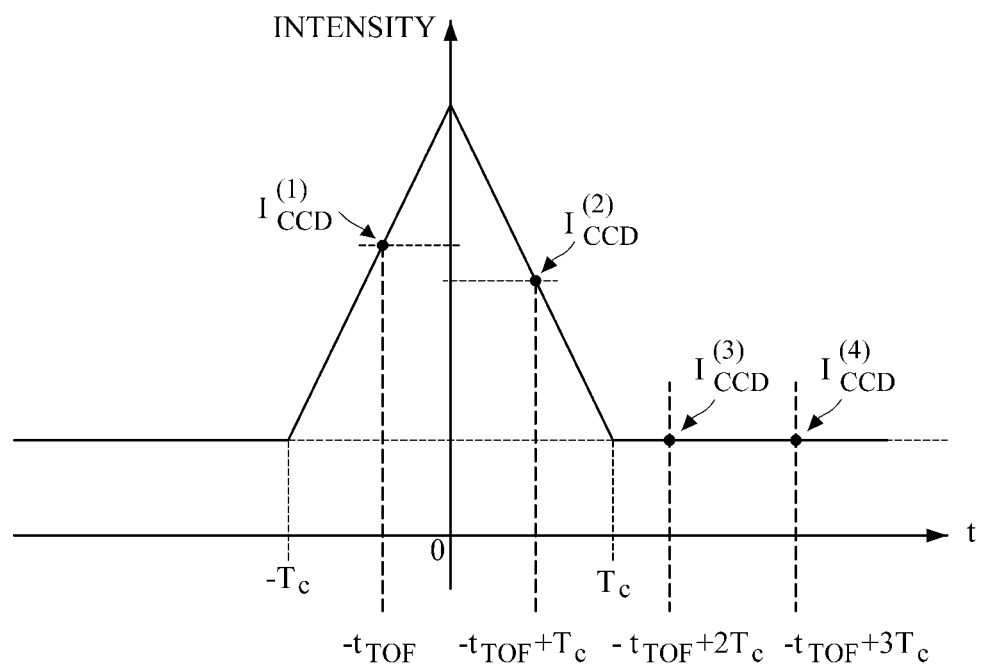
FIGS. 9A to 9D are diagrams illustrating examples of a method of calculating a depth when four or more intensity images are captured.

Referring to the example illustrated in FIG. 9A, in the region of $0 < t_{TOF} < T_C$, an intensity image $I^{(M)}_{CCD}$ having a minimum intensity value is an intensity image $I^{(3)}_{CCD}$ and an intensity image $I^{(4)}_{CCD}$ among the intensity images $I^{(1)}_{CCD}$, $I^{(2)}_{CCD}$, $I^{(3)}_{CCD}$, and $I^{(3)}_{CCD}$. In this case, a depth may be calculated as Equation 14.

$$\text{depth} = \frac{cT_c}{2} \frac{I_{CCD}^{(2M)}}{I_{CCD}^{(1M)} + I_{CCD}^{(2M)}} \quad \text{[Equation 14]}$$

Figure 9B:
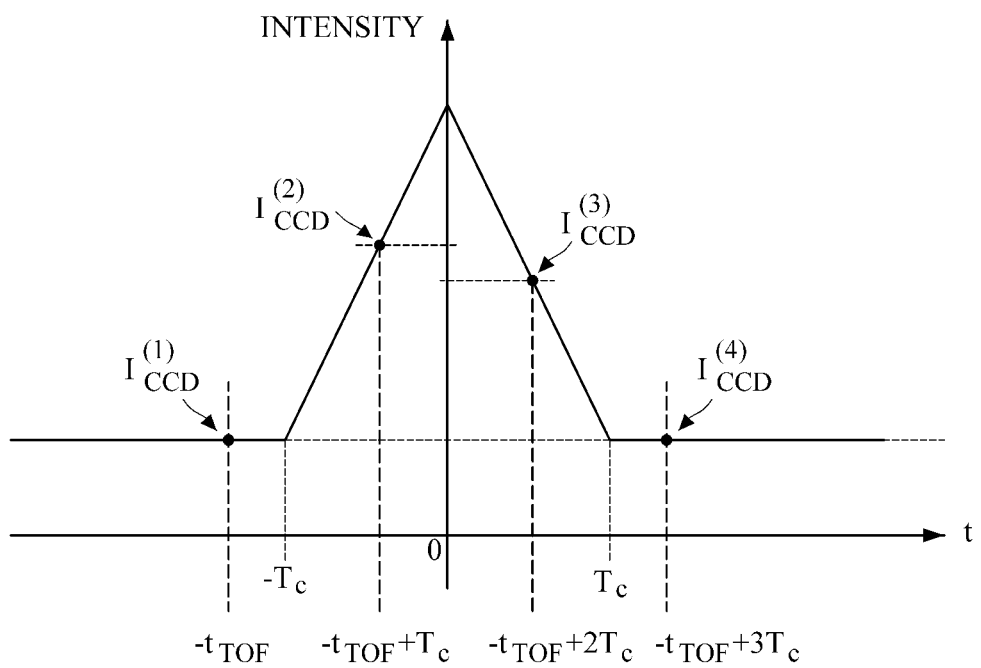

Referring to the example illustrated in FIG. 9B, in the region of $T_C < t_{TOF} < 2T_C$, an intensity image $I^{(M)}_{CCD}$ having a minimum intensity value is an intensity image $I^{(1)}_{CCD}$ and an intensity image $I^{(4)}_{CCD}$ among the intensity images $I^{(1)}_{CCD}$, $I^{(2)}_{CCD}$, $I^{(3)}_{CCD}$, and $I^{(3)}_{CCD}$. In this case, a depth may be calculated as Equation 15.

$$\text{depth} = \frac{cT_c}{2}\left[1 + \frac{I_{CCD}^{(3M)}}{I_{CCD}^{(2M)} + I_{CCD}^{(3M)}}\right] \quad \text{[Equation 15]}$$

Figure 9C:
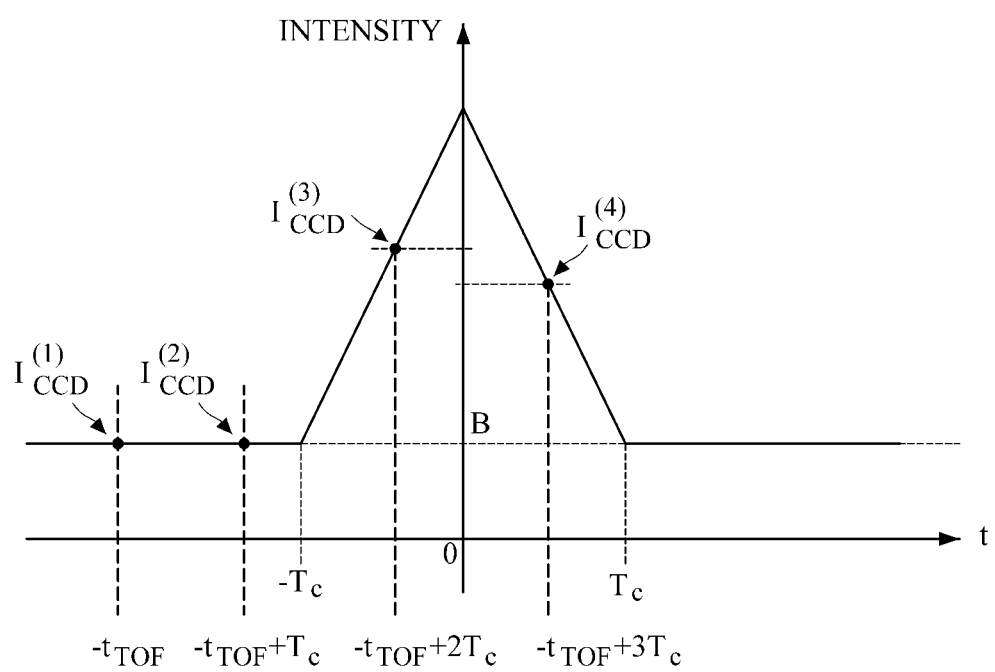

Referring to the example illustrated in FIG. 9C, in the region of $2T_C < t_{TOF} < 3T_C$, an intensity image $I^{(M)}_{CCD}$ having a minimum intensity value is an intensity image $I^{(1)}_{CCD}$ and an intensity image $I^{(2)}_{CCD}$ among the intensity images $I^{(1)}_{CCD}, I^{(2)}_{CCD}, I^{(3)}_{CCD}$, and $I^{(3)}_{CCD}$. In this case, a depth may be calculated as Equation 16.

$$\text{depth} = \frac{cT_c}{2}\left[2 + \frac{I_{CCD}^{(4M)}}{I_{CCD}^{(3M)} + I_{CCD}^{(4M)}}\right] \quad \text{[Equation 16]}$$

Figure 9D:
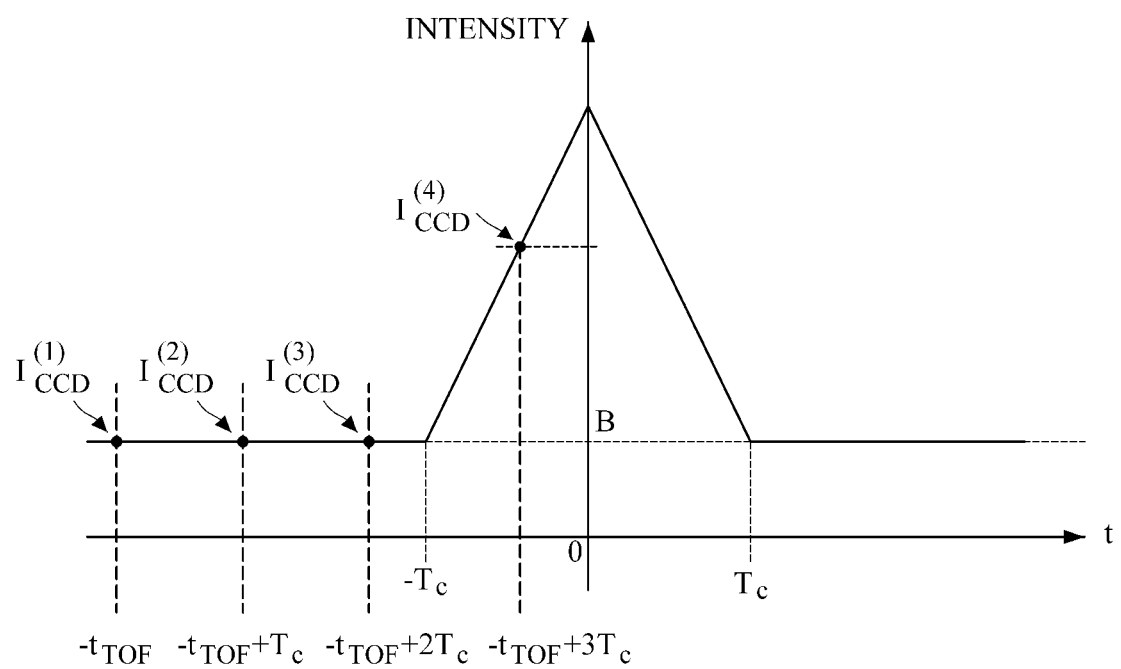

Referring to the example illustrated in FIG. 9D, in the region of $3T_C < t_{TOF}$, an intensity image $I^{(M)}_{CCD}$ having a minimum intensity value is an intensity image $I^{(1)}_{CCD}$, an intensity image $I^{(2)}_{CCD}$, and an intensity image $I^{(3)}_{CCD}$ among the intensity images $I^{(1)}_{CCD}, I^{(2)}_{CCD}, I^{(3)}_{CCD}$, and $I^{(4)}_{CCD}$, and a depth is $\text{depth} > \frac{3}{2}cT_C$. Thus, a depth cannot be calculated.

In one example, by use of four or more general intensity image samples, the depth image process unit 160 may determine which intensity image has a minimum intensity, determine two intensity images having the two top intensities which are different from the minimum intensity image, and calculate a depth according to the determination results. The method of generating a depth image by sampling four or more intensity images may be represented by Equation 17.

i) By applying consecutive leading times (0, $T_C$, $2T_C$) of the IR light source 130 or delay times (0, $T_C$, $2T_C$) of the optical modulator 153, intensity images $I^{(1)}{}_{CCD}$, $I^{(2)}{}_{CCD}$, $I^{(3)}{}_{CCD}$, ..., $I^{(N)}{}_{CCD}$ of the optical sensor 155 are generated with an PN-sequence at the minimum information unit transmission time $T_C$, that is, intensity values are measured.

ii) The minimum intensity and the two maximum intensities (consecutive two measurements which are not 0) are calculated.

$$\min(I_{CCD}{}^{(1)}, I_{CCD}{}^{(2)}, I_{CCD}{}^{(3)}, \ldots I_{CCD}{}^{(N)}) = I_{CCD}{}^{(M)}$$

$$\text{non\_zero}(I_{CCD}{}^{(1M)}, I_{CCD}{}^{(2M)}, I_{CCD}{}^{(3M)}, \ldots I_{CCD}{}^{(NM)}) = \{I_{CCD}{}^{(aM)}, I_{CCD}{}^{(bM)}\} \quad [\text{Equation 17}]$$

iii) A depth is calculated.

$$\text{depth} = \frac{cT_c}{2}\left[a - 1 + \frac{I_{CCD}^{(bM)}}{I_{CCD}^{(aM)} + I_{CCD}^{(bM)}}\right],$$

where non_zero($I_{CCD}{}^{(1M)}$, $I_{CCD}{}^{(2M)}$, $I_{CCD}{}^{(3M)}$, ... $I_{CCD}{}^{(NM)}$) = $\{I_{CCD}{}^{(aM)}\}$, the number of intensity images is smaller than 1, and $$\text{depth} > \frac{cT_c}{2}(N-1).$$

As shown in the above, in extraction of a depth image by capturing N intensity images, that is, sub-frames, the maximum capturing distance is $(N-1)cT_C/2$, which linearly increases in proportion with N.

Then, a relationship with a depth extraction error and a length of a measurable depth according to the setting of the time delay $t_{di}$ of the second PN-sequence of the optical modulator 153 will be described.

In one example, in the course of obtaining N intensity images, for example, four intensity images $I^{(1)}{}_{CCD}$, $I^{(2)}{}_{CCD}$, $I^{(3)}{}_{CCD}$, and $I^{(4)}{}_{CCD}$, the time delay $t_{di}$ of the optical modulator 153 is appropriately adjusted, an error of depth extraction may be reduced, or selective depth extraction with regard to a region in which an object is present may be realized.

Figure 10:
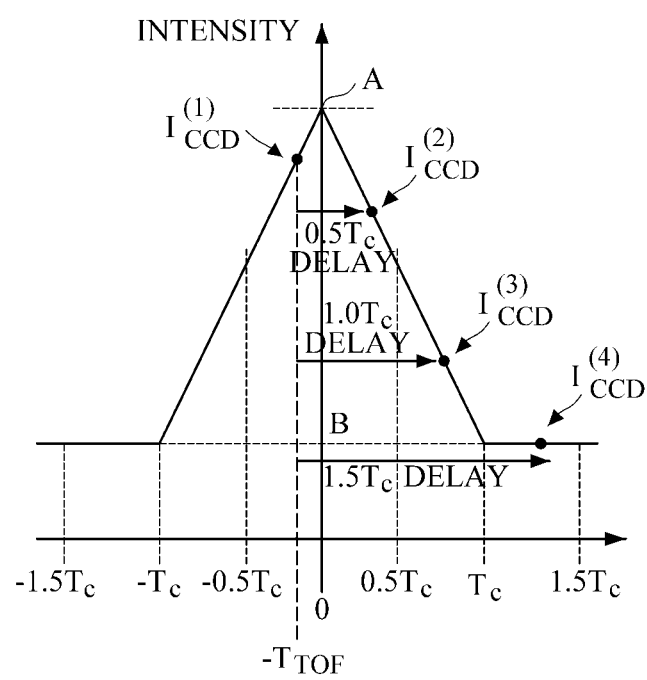
FIG. 10 is a diagram illustrating an example of an intensity image when a time delay of the optical modulator is set to $T_C/2$.

FIG. 10 illustrates an example of an intensity image when a time delay of the optical modulator is set to $T_C/2$.

As shown in the example illustrated in FIG. 10, it is assumed that a time delay of the optical modulator 153 is set to $T_C/2$ not $T_C$, that is, the interval decreases to a half, and thus the time interval is set to (0, $T_C/2$, $T_C$, $3T_C/2$). In this case, a length of time in a distance measurement region is $2T_C$, which is shorter than in a case of use of a time delay of $I_C$.

In addition, in capturing of a plurality of intensity images, if the optical modulator 153 adjusts the length of the first time delay $t_{di}$ of the second PN-sequence and accordingly moves the remaining time delays of the second PN-sequence, time intervals between the first sampled intensity image and the last sampled intensity image of the optical sensor 155 are reduced. Therefore, the intermediate value of the capturing range may be allowed to move. A depth may be obtained in a capturing range selected by the above-described method.

In this regard, to solve Equation 8 for obtaining three unknown quantities, four equations as below may be derived as the measurement region is shortened.

$$I_{CCD}^{(1)} = -\frac{A-B}{T_c}(-t_{TOF}) + A \quad [\text{Equation 18}]$$

$$I_{CCD}^{(2)} = -\frac{A-B}{T_c}(-t_{TOF} + 0.5T_c) + A$$

$$I_{CCD}^{(3)} = -\frac{A-B}{T_c}(-t_{TOF} + T_c) + A$$

$$I_{CCD}^{(4)} = B,$$

where $A = rP_{PN}G_{PN} + [rP_{DC} + P_{amb}]G_{DC}$, and $B = [rP_{DC} + P_{amb}]G_{DC}.$ Since three unknown quantities including a distance to the object are extracted from the four equations, multiple solutions are present with respect to the unknown quantities, unlike when the time delay of the optical modulator 153 is Tc. In one example, from the multiple solutions, a final unknown quantity may be determined using least square or the combination of optimal measurements. Equation 19 below represents results of depth extraction according to three equations selected from the four equations.

When use of $I_{CCD}^{(1)}$, $I_{CCD}^{(2)}$, $I_{CCD}^{(3)}$, $\quad [\text{Equation 19}]$ $$\text{depth} = \frac{cT_c}{2}\frac{I_{CCD}^{(23)} - I_{CCD}^{(12)}}{4I_{CCD}^{(23)}}$$

When use of $I_{CCD}^{(1)}$, $I_{CCD}^{(2)}$, $I_{CCD}^{(4)}$, $$\text{depth} = \frac{cT_c}{2}\frac{-I_{CCD}^{(14)} + 2I_{CCD}^{(24)}}{2(I_{CCD}^{(14)} + I_{CCD}^{(24)})}$$

When use of $I_{CCD}^{(1)}$, $I_{CCD}^{(3)}$, $I_{CCD}^{(4)}$, $$\text{depth} = \frac{cT_c}{2}\frac{I_{CCD}^{(34)}}{I_{CCD}^{(14)} + I_{CCD}^{(34)}}$$

When use of $I_{CCD}^{(2)}$, $I_{CCD}^{(3)}$, $I_{CCD}^{(4)}$, $$\text{depth} = \frac{I_{CCD}^{(34)}}{2(I_{CCD}^{(24)} - I_{CCD}^{(34)})}.$$

If an error is present in the measurements of the optical sensor 155 due to noise, signal distortion, and the like, the above four results may show different values. In one example, for final depth extraction, the depth image process unit 160 may average the four results. For example, the depth image process unit 160 may use a least square method to determine a depth or to select one having the favorable error characteristic from the four results.

As an example, if a measurement of the optical sensor 155 includes uniform random noise having a deviation of σ(n), perturbation theory may be used to find an analytic solution of an depth extraction error σ(d) as below.

When the use of $I_{CCD}^{(1)}$, $I_{CCD}^{(2)}$, $I_{CCD}^{(3)}$, $\quad [\text{Equation 20}]$ $$\sigma(d) = \frac{cT_c}{8I_{CCD}^{(23)2}}\sqrt{I_{CCD}^{(12)2} + I_{CCD}^{(23)2} + (I_{CCD}^{(12)} + I_{CCD}^{(23)})^2} \cdot \sigma(n).$$

When the use of $I_{CCD}^{(1)}$, $I_{CCD}^{(2)}$, $I_{CCD}^{(4)}$,

-continued $$\sigma(d) = \frac{3cT_c}{4(I_{CCD}^{(14)} + I_{CCD}^{(24)})^2}$$

$$\sqrt{I_{CCD}^{(14)^2} + I_{CCD}^{(24)^2} + (I_{CCD}^{(14)} - I_{CCD}^{(24)})^2} \cdot \sigma(n)$$

When the use of $I_{CCD}^{(1)}, I_{CCD}^{(3)}, I_{CCD}^{(4)}$, $$\sigma(d) = \frac{cT_c}{2(I_{CCD}^{(14)} + I_{CCD}^{(34)})^2}$$

$$\sqrt{I_{CCD}^{(14)^2} + I_{CCD}^{(34)^2} + (I_{CCD}^{(14)} - I_{CCD}^{(34)})^2} \cdot \sigma(n)$$

When the use of $I_{CCD}^{(2)}, I_{CCD}^{(3)}, I_{CCD}^{(4)}$, $$\sigma(d) = \frac{cT_c}{4(I_{CCD}^{(24)} + I_{CCD}^{(34)})^2} \sqrt{I_{CCD}^{(24)^2} + I_{CCD}^{(34)^2} + (I_{CCD}^{(24)} - I_{CCD}^{(34)})^2} \cdot \sigma(n)$$

The depth image process unit 160 may use Equation 20 to clarify an optimal solution having the smallest error.

The above mathematical analysis is performed in the case of $0 < t_{TOF} < T_c/2$, and if the same analysis is applied to the cases of $T_c/2 < t_{TOF} < T_c$ and $2T_c < t_{TOF} < 3T_c/2$, a depth extraction method which has the most favorable depth extraction error characteristic, that is, the smallest error deviation estimate of an error, may be clarified.

Since there are no theoretical limitations in a time delay of the optical modulator 153 and the number of intensity images (sub-frames), a user may be freed to set the time delay and the number of intensity images within the hardware capacity. As described above, since the method of reducing the time delay $t_{di}$ of the optical modulation waveform of the optical modulator 153 is performed for more sampling, which is utilized for distance operation for depth extraction, this method may be employed to improve depth precision.

Alternatively, if the time delay $t_{di}$ of the optical modulator 153 is fixed and the number of sub-frames is increased, as represented by Equation 17, this method may be employed to expand a possible range of depth extraction of the apparatus 100 and theoretically, no limitation of the range is present. However, if the object 10 is placed more distant, the maximum measurement range may be determined according to the hardware such as deterioration of intensity of reflective light. In addition, the time delay $t_{di}$ of the optical modulator 153 to be applied may be sequentially increased starting from a value defined by the user or a device, not from 0. Thus, the above method may allow an object within a specific distance range to be selectively captured since the depth extraction range does not start from 0 that is close to a camera, but starts more than a specific distance range to be measured.

In one example, by use of a depth extraction method using a PN-sequence, interference between multiple users may be prevented by the inherent characteristics of the PN-sequence. That is, if there are different types of PN-sequences of different users or even the same sequences which are not synchronized with one another, auto-correlation or cross-correlation between the sequences, that is, values captured by the optical sensor 155 are significantly small, and thus infrared light emitted from a camera of another user can be removed.

Figure 11:
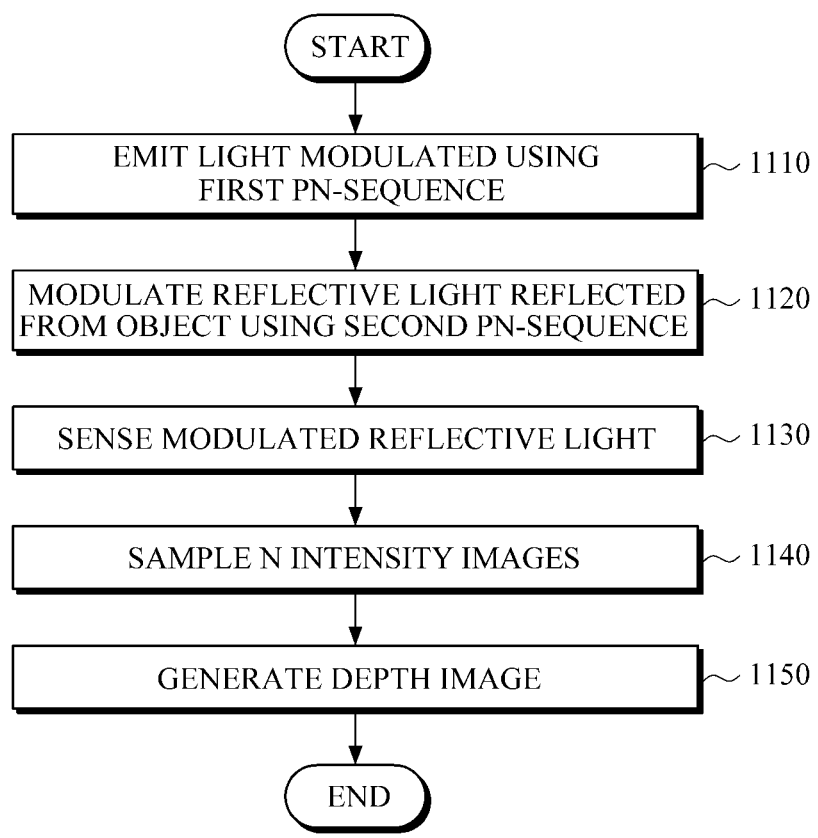
FIG. 11 is a flowchart illustrating an example of a method of generating a depth image according to an exemplary embodiment.

FIG. 11 illustrates a flowchart of an example of a method of generating a depth image. The apparatus 100 for generating a depth image emits light modulated by use of a first PN-sequence (1110).

The apparatus 100 performs optical modulation on reflective light which is emitted from the apparatus 100 and reflected from an object using a second PN-sequence that has the same sequence as the first PN-sequence and has N different time shifts with respect to the first PN-sequence (1120). N may be a number more than 3.

The apparatus 100 may perform operations 1110 and 1120 in a different manner. More specifically, the apparatus 100 may modulate light using N first PN-sequences having, respectively, N different time shifts, and radiate the modulated light at operation 1110. Then, at operation 1120, the apparatus may perform optical modulation on reflective light reflected from the object due to the radiation of the modulated light, using a single second PN-sequence which has the same sequence as the first PN-sequence and has a time shift from the first PN-sequence.

The apparatus 100 senses the reflective light that has been through optical modulation (1130).

The apparatus 100 samples N intensity images obtained by the optical modulation from among sensed light signals (1140).

The apparatus 100 generates a depth image of the object using the sampled N intensity images (1150).

If three intensity images are sampled, the apparatus 100 may determine whether an intensity image having the minimum intensity is the first captured intensity image or the thirdly captured intensity image, and calculate a depth according to the determination result. Moreover, if four or more intensity images are sampled, the apparatus 100 may determine which intensity image is an intensity image having the minimum intensity, determine which intensity images are the top two intensity images which are different from the minimum intensity image among the four intensity images, and calculate a depth according to the determination result.

The apparatus may use a first PN-sequence and a second PN-sequence which are different from a PN-sequence used by another apparatus for generating a depth image, which is different from, for example, another apparatus for generating a depth image used by another user. Alternatively, the apparatus 100 may use a first PN-sequence and a second PN-sequence which are the same as PN-sequences of another apparatus, but are not synchronized with the PN-sequences of the other apparatus.

In one example, the interference between multiple users which occurs in general depth extraction is allowed to be prevented by the characteristics of the PN-sequence which has a small cross-correlation and a small auto-correlation between the same sequences that are not synchronized with each other.

In capturing of intensity images, an interval between time delays of a shutter is adjusted to increase the number of measurement of the intensity images for depth calculation, so that a plurality of depths can be calculated, the calculated depths can be averaged, or an optimal combination can be selected and calculated. Accordingly, an error due to noise is reduced, thereby achieving high depth extraction precision.

In capturing of a plurality of intensity images, a capturing distance range may be increased with the number of intensity images of a shutter. At this time, additional waveform generation or an additional device is not needed, but rather the intensity images are only captured with the increased number of times of applying a time delay to an optical modulator.

In addition, in capturing of a plurality of intensity images, a length of a time delay of the first intensity image may be adjusted, the time delay may be moved accordingly, and according to the time delay, an intermediate value of a capturing range may be moved.

Moreover, compared to an existing method, an additional operation is significantly small, and thus a depth image can be captured in real time.

Furthermore, since a light source, an optical modulator, and an image capturing apparatus which are used for general depth extraction are used, additional cost is not incurred.

The methods and/or operations described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples of the present inventive concept have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for generating a depth image, the apparatus comprising:
   an optical modulator which optically modulates reflective light which is reflected light from an object to which light modulated using a first pseudorandom (PN) sequence is irradiated, by use of second PN-sequences, each of which has a same PN sequence as the first PN-sequence, but the second PN-sequences having N different time shifts;
   an optical sensor which senses the optically modulated reflective light; and
   a depth image process unit which samples N intensity images from the optically modulated reflective light sensed by the optical sensor and generates a depth image of the object using the sampled N intensity images,
   wherein the depth image process unit individually determines respective depth extraction errors of each of a plurality of depths when the plurality of depths are determined according to a plurality of times of flight of light that are predicted using the N sampled intensity images, and selects a depth of the plurality of depths having a smallest error deviation estimate of the errors as a final depth of the depth image,
   wherein the depth image process unit calculates a time of flight of light that is irradiated from a light source and reaches the optical sensor based on the N sampled intensity images, and
   wherein when N is a number that is equal to or greater than 3, the depth image process unit determines whether an intensity image $I_M$ havin a minimum intensity among the three or more sampled intensity images is a first captured intensity image $I_1$ or a thirdly captured intensity image $I_3$, and calculates a depth according to the determination result.

2. The apparatus of claim 1, wherein the first PN-sequence and the second PN-sequences are bipolar m-sequences, and
   a minimum information unit transmission time $T_C$ and a length of sequence of the first PN-sequence are the same as a minimum information unit transmission time $T_C$ and a length of sequence, respectively, of the second PN-sequences.

3. The apparatus of claim 1, wherein the first PN-sequence and the second PN-sequence are Walsh-codes or gold-sequences.

4. The apparatus of claim 1, wherein the N intensity images that are sampled correspond respectively to the N different time shifts of the second PN-sequences.

5. The apparatus of claim 1, wherein the depth image process unit models the sampled N intensity images using a function including the time of flight of light that is irradiated from the light source and reaches the optical sensor as an unknown quantity.

6. The apparatus of claim 5, wherein the function including the time of flight as an unknown quantity further includes ambient light and reflectivity of the reflective light as unknown quantities.

7. The apparatus of claim 5, wherein when four or more intensity images are sampled, the depth image process unit determines which intensity image $I_M$ has a minimum intensity and which two intensity images have two top intensities which are different from the minimum intensity among the four or more intensity images, and calculates a depth according to the determination result.

8. The apparatus of claim 5, wherein the depth image process unit further determines the final depth by averaging the plurality of depths when the plurality of depths are determined according to the plurality of times of flight of light that are predicted using the N sampled intensity images.

9. The apparatus of claim 1, further comprising:
   the light source which emits light to an object;
   a light source driver which drives the light source;
   an optical modulator driver which drives the optical modulator; and
   a control unit which controls the light source driver to generate a light driving waveform of the light source using the first PN-sequence, and controls the optical modulator driver to generate an optical modulation driving waveform of the optical modulator using the second PN-sequence.

10. The apparatus of claim 9, wherein the depth image process unit increases a number of times of sampling the intensity images for expanding a capturing range of the depth image while the control unit maintains a constant interval between time shifts.

11. The apparatus of claim 9, wherein the control unit increases precision of the depth image by controlling the light source driver and the optical modulator driver such that an interval between the time shifts is shorter than a minimum information unit transmission time $T_C$ of the first and second PN-sequences, and the depth image process unit samples the intensity images at the interval of the time shift.

12. The apparatus of claim 1, wherein the first PN-sequence and the second PN-sequence are different from those of a different apparatus for generating a depth image.

13. The apparatus of claim 1, wherein the first PN-sequence and the second PN-sequence are the same as those of a different apparatus for generating a depth image, but the first PN-sequence and the second PN-sequence are not synchronized with those of the different apparatus.

14. An apparatus for generating a depth image, the apparatus comprising:
   an optical modulator which optically modulates reflective light which is reflected light from an object to which light modulated using N first pseudorandom (PN) sequences having, respectively, N different time shifts is irradiated, by use of a second PN-sequence which has a same PN sequence as that of the first PN-sequences but has a time shift different from those of the first PN-sequences;
   an optical sensor which senses the optically modulated reflective light; and
   a depth image process unit which samples N intensity images from light signals sensed by the optical sensor and generates a depth image of the object using the sampled N intensity images,
   wherein the depth image process unit individually determines respective depth extraction errors of each of a plurality of depths when the plurality of depths are determined according to a plurality of times of flight of light that are predicted using the N sampled intensity images, and selects a depth of the plurality of depths having a smallest error deviation estimate of the errors as a final depth of the depth image,
   wherein the depth image process unit calculates a time of flight of light that is irradiated from a light source and reaches the optical sensor based on the N sampled intensity images, and
   wherein when N is a number that is equal to or greater than 3, the depth image process unit determines whether an intensity image $I_M$ having a minimum intensity among the three or more sampled intensity images is a first captured intensity image $I_1$ or a thirdly captured intensity image $I_3$, and calculates a depth according to the determination result.

15. The apparatus of claim 14, wherein the depth image process unit models the sampled N intensity images with a function including the time of flight of light that is irradiated from the light source and reaches the optical sensor as an unknown quantity.

16. A method of generating a depth image, the method comprising:
   performing optical modulation on reflective light which is reflected light from an object to which light modulated using a first pseudorandom (PN) sequence is irradiated, by use of a second PN-sequence which has a same PN sequence as a first PN-sequence but the second PN-sequence has N different time shifts;
   sensing the optically modulated reflective light using an optical sensor;
   sampling N intensity images obtained from the sensed optically modulated reflective light; and
   generating a depth image of the object using the N sampled intensity images,
   wherein the generating comprises individually determining respective depth extraction errors of each of a plurality of depths when the plurality of depths are determined according to a plurality of times of flight of light that are predicted using the N sampled intensity images, and selecting a depth of the plurality of depths having a smallest error deviation estimate of the errors as a final depth of the depth image, and
   wherein the method further comprises:
   calculating a time of flight of light that is irradiated from a light source and reaches the optical sensor based on the N sampled intensity images, and
   when N is a number that is equal to or greater than 3, determining whether an intensity inriageavin a minimum intensity among the three or more sampled intensity images is a first captured intensity image $I_1$ or a thirdly captured intensity image $I_3$, and calculating a depth according to the determination result.

17. The method of claim 16, wherein the first PN-sequence and the second PN-sequence are the same as those of a different apparatus for generating a depth image, but the first PN-sequence and the second PN-sequence are not synchronized with those of the different apparatus.

18. A method of generating a depth image, the method comprising:
   irradiating light modulated using a first pseudorandom (PN) sequence toward an object;
   optically modulating, using a plurality of second PN-sequences, light that is reflected off of the object, the second PN-sequences having a same PN-sequence as the first PN sequence;
   sensing the optically modulated light using an optical sensor;
   sampling N intensity images from the sensed optically modulated light; and
   generating a depth image of the object using the N sampled intensity images,
   wherein the second PN-sequences have N different time shifts, and
   wherein the generating comprises individually determining respective depth extraction errors of each of a plurality of depths when the plurality of depths are determined according to a plurality of times of flight of light that are predicted using the N sampled intensity images, and selecting a depth of the plurality of depths having a smallest error deviation estimate of the errors as a final depth of the depth image, and
   wherein the method further comprises:
   calculating a time of flight of light that is irradiated from a light source and reaches the optical sensor based on the N sampled intensity images, and
   wherein when N is a number that is equal to or greater than 3, determining whether an intensity image $I_M$ having a minimum intensity among the three or more sampled intensity images is a first captured intensity image $I_1$ or a thirdly captured intensity image $I_3$, and calculating a depth according to the determination result.

19. The method of claim 18, wherein N is equal to or greater than four.

* * * * *